US012691695B2

(12) United States Patent
De Roeck

(10) Patent No.: US 12,691,695 B2
(45) Date of Patent: Jul. 28, 2026

(54) PRINTING METHOD ON CARDBOARD IN AN INKJET PRINTING DEVICE

(71) Applicant: Agfa NV, Mortsel (BE)

(72) Inventor: Luc De Roeck, Mortsel (BE)

(73) Assignee: Agfa NV, Mortsel (BE)

( * ) Notice: Subject to any disclaimer, the term of this patent is extended or adjusted under 35 U.S.C. 154(b) by 235 days.

(21) Appl. No.: 18/713,765

(22) PCT Filed: Nov. 28, 2022

(86) PCT No.: PCT/EP2022/083421

§ 371 (c)(1),
(2) Date: May 28, 2024

(87) PCT Pub. No.: WO2023/094645

PCT Pub. Date: Jun. 1, 2023

(65) Prior Publication Data

US 2025/0026135 A1 Jan. 23, 2025

(30) Foreign Application Priority Data

Nov. 29, 2021 (EP) .................................... 21211036

(51) Int. Cl.
*B41J 3/407* (2006.01)
*B41J 11/00* (2006.01)
(Continued)

(52) U.S. Cl.
CPC ........... *B41J 11/0085* (2013.01); *B41J 3/407* (2013.01); *B41J 13/0063* (2013.01); *B41J 13/08* (2013.01)

(58) Field of Classification Search
CPC ........ B41J 3/407; B41J 3/4078; B41J 11/007; B41J 11/0085; B41J 13/0063; B41J 13/08;
(Continued)

(56) References Cited

U.S. PATENT DOCUMENTS 10,632,766 B2 * 4/2020 De Roeck ................ B41J 3/407
11,872,805 B2 * 1/2024 De Roeck .............. B41J 11/007
(Continued)

FOREIGN PATENT DOCUMENTS

CN 209683207 U 11/2019
EP 3165371 A1 5/2017
(Continued)

OTHER PUBLICATIONS

European Patent Office, International Search Report in International Patent Application No. PCT/EP2022/083421, mailed Jan. 20, 2023, 3 pp.

(Continued)

*Primary Examiner* — Anh T Vo
(74) *Attorney, Agent, or Firm* — Leydig, Voit & Mayer, Ltd.

(57) ABSTRACT

An inkjet printing method on a rectangular cardboard having a width between a first side and a second side, parallel to each other, comprising: —applying a first strap (400) and a second strap (400), parallel to each other and with a space between each other, on a vacuum belt (500) which has a rough support area having a surface roughness (Ra) from 8.0 μm to 3500.0 μm—applying the cardboard (300) on the vacuum belt (500) wherein said cardboard (300) overlaps partially the applied first strap (400) at the first side of said cardboard (300) and overlaps partially the applied second strap (400) at the second side of said cardboard (300) and wherein between said first side and second side the cardboard is in contact with the vacuum belt (500); —applying vacuum power at said rough support area for attaching said strap (400) and said cardboard (300); —transporting said attached straps (400) and attached cardboard (300) during inkjet printing an image on said attached cardboard (300).

15 Claims, 4 Drawing Sheets

(51) Int. Cl.
*B41J 13/00* (2006.01)
*B41J 13/08* (2006.01)

(58) Field of Classification Search
CPC . B65H 5/08; B65H 5/22; B65H 5/224; B65H 11/002; B65H 11/005
See application file for complete search history.

(56) References Cited

U.S. PATENT DOCUMENTS

2018/0050547 A1* 2/2018 Ishizuka ................ B41J 15/048
2019/0240999 A1 8/2019 Vaillancourt et al.

FOREIGN PATENT DOCUMENTS

EP 3017957 B1 1/2020
EP 3538371 B1 10/2020
EP 3868563 A1 8/2021

OTHER PUBLICATIONS

European Patent Office, Written Opinion in International Patent Application No. PCT/EP2022/083421, mailed Jan. 20, 2023, 6 pp.

* cited by examiner

PRINTING METHOD ON CARDBOARD IN AN INKJET PRINTING DEVICE

CROSS-REFERENCE TO RELATED APPLICATIONS

This patent application is the U.S. national stage of copending International Patent Application No. PCT/EP2022/083421, filed Nov. 28, 2022, which claims the benefit of European Patent Application No. 21211036.5, filed Nov. 29, 2021.

TECHNICAL FIELD

The present invention is related to a printing method with a transport system for cardboard (300) in an inkjet printing device.

BACKGROUND ART

Cardboard (300) is a paper-based substrate that has a better durability than just paper. Cardboard (300) is mostly used in commerce and industry for packaging products. An example of cardboard (300) is corrugated fiberboard.

But cardboard (300) is very sensitive to environmental conditions, especially moisture which influences for example the stacking strength of a folded box made of cardboard. Other effects are cracking, impact resistance, bending, shock absorption and cushioning. The fibers in the cardboard (300) may for example expand/swell when the humidity becomes higher which causes deformation of the cardboard (300) such as wavy edges and/or warping due to inner tensions resulting from non-uniform distribution of the moisture within the cardboard. The cardboard (300) is hereby not flat which makes it difficult to handle and to transport under one or more inkjet print heads, which can be solved by altering the distance between the nozzles of said inkjet print heads and the cardboard, the so-called height-gap. But as is well known, the height-gap has to be small to have a good print quality.

Restricting the environmental conditions of cardboard, before it is applied in the inkjet printing device, is a well-known solution to have flat cardboard (300) in the inkjet printing device but it is an expensive solution (need for stacking room, energy consumption).

In some inkjet printing devices, a heater and/or humidifier are added at the input of the inkjet printing device where the cardboard (300) is applied in the inkjet printing device so the environmental conditions are controlled at adjusted depending on the applied cardboard. The time of drying and/or humidifying is hereby often too short for re-flattening the cardboard.

A vacuum belt system is a well-known transport system in inkjet printing devices wherein a substrate is air-sucked via air-suction elements, such as apertures in a conveyor belt, wherein said air-suction elements are connected to a vacuum chamber. The substrate is transported with the conveyor belt and hold down by vacuum power. An example of such vacuum belt in an inkjet printing device is disclosed in EP3017957A1 (AGFA NV) at FIGS. 6 and 7, paragraph [0135].

But the use of a vacuum belt system for cardboard (300) having wavy edges or warped surface due to inner tensions resulting from non-uniform distribution of the moisture within the cardboard (300) results that the cardboard (300) is not hold well against the vacuum belt whereby more vacuum power is needed but said power is not unlimited. Too much vacuum power results also in a very noisy print-environment caused by air-suction in non-covered air-suction elements which can lead to hearing problems. Also the cardboard (300) can suddenly, for example by changes in the inner tensions, warp up from the vacuum belt which can cause a collision against the expensive and very accurately aligned inkjet print heads.

To hold down the cardboard (300) better against a vacuum belt a push down mechanism is disclosed in EP3165371A1 (AGFA NV) whereby small parallel bars are pressed against the cardboard (300) but hereby inkjet ink cannot have applied on said cardboard (300) where said bars are touching said cardboard. The maximum print area on the cardboard (300) is hereby limited with said solution and thus borderless printing is not possible. Borderless printing is a must when printing on cardboard. It allows that an image to be printed without an unprinted margin at the sides of the print.

So, there is need for a solution for transporting any cardboard (300) and for printing borderless, regardless wavy edges or warped surface due to inner tensions resulting from non-uniform distribution of the moisture within the cardboard (300) without the chance of warping up the cardboard (300) which can cause collisions against one or more inkjet print heads.

SUMMARY OF INVENTION

In order to overcome the problems described above, embodiments of the present invention have been realised with an inkjet printing method as defined in claim 1.

BRIEF DESCRIPTION OF DRAWINGS

The figures show a cross-view of an inkjet printing device in A and a corresponding top-view of the inkjet printing device in B. The inkjet printing device have a rough vacuum belt (500); a vacuum support (530) and a vacuum chamber (540) whereby the rough vacuum belt (500) is wrapped over two pulleys (510); the vacuum support (530) and the vacuum chamber (540) for transporting a strap (400) and a cardboard (300).

DESCRIPTION OF EMBODIMENTS

Figure 1:
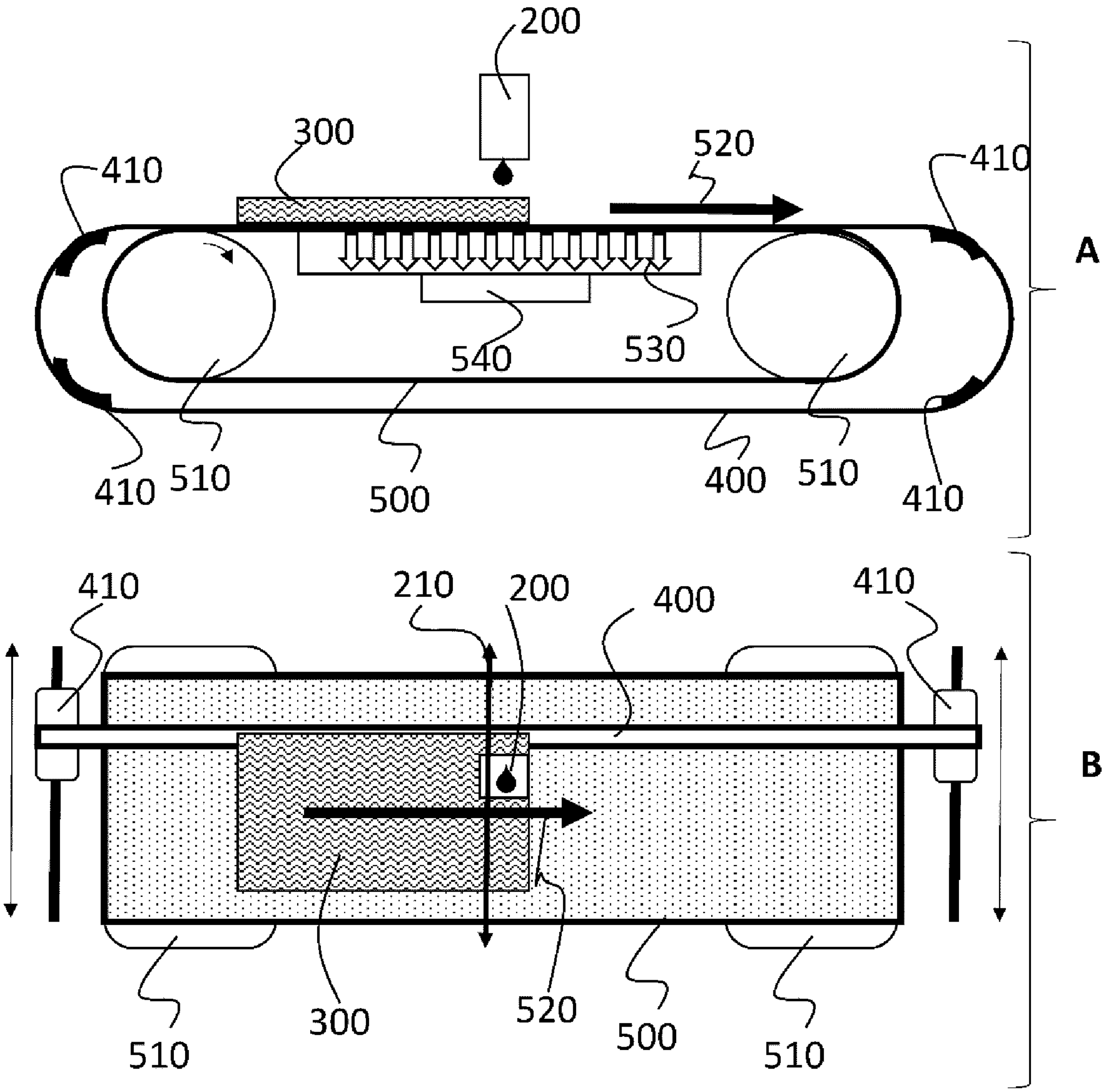
FIG. 1 shows an inkjet printing device having one strap (400) according to a preferred embodiment positioned up the rough vacuum belt (500) and below a side of the cardboard (300). The strap (400) is wrapped around gliders (410) which are movable (arrows) across the transport direction (520). The inkjet head (200) is hereby also moving (210) across the transport direction (520) as a known wide-format inkjet printing method. By said gliders is the inkjet printing device capable of moving said strap (400) so the cardboard overlaps partially the strap (400).
Figure 2:
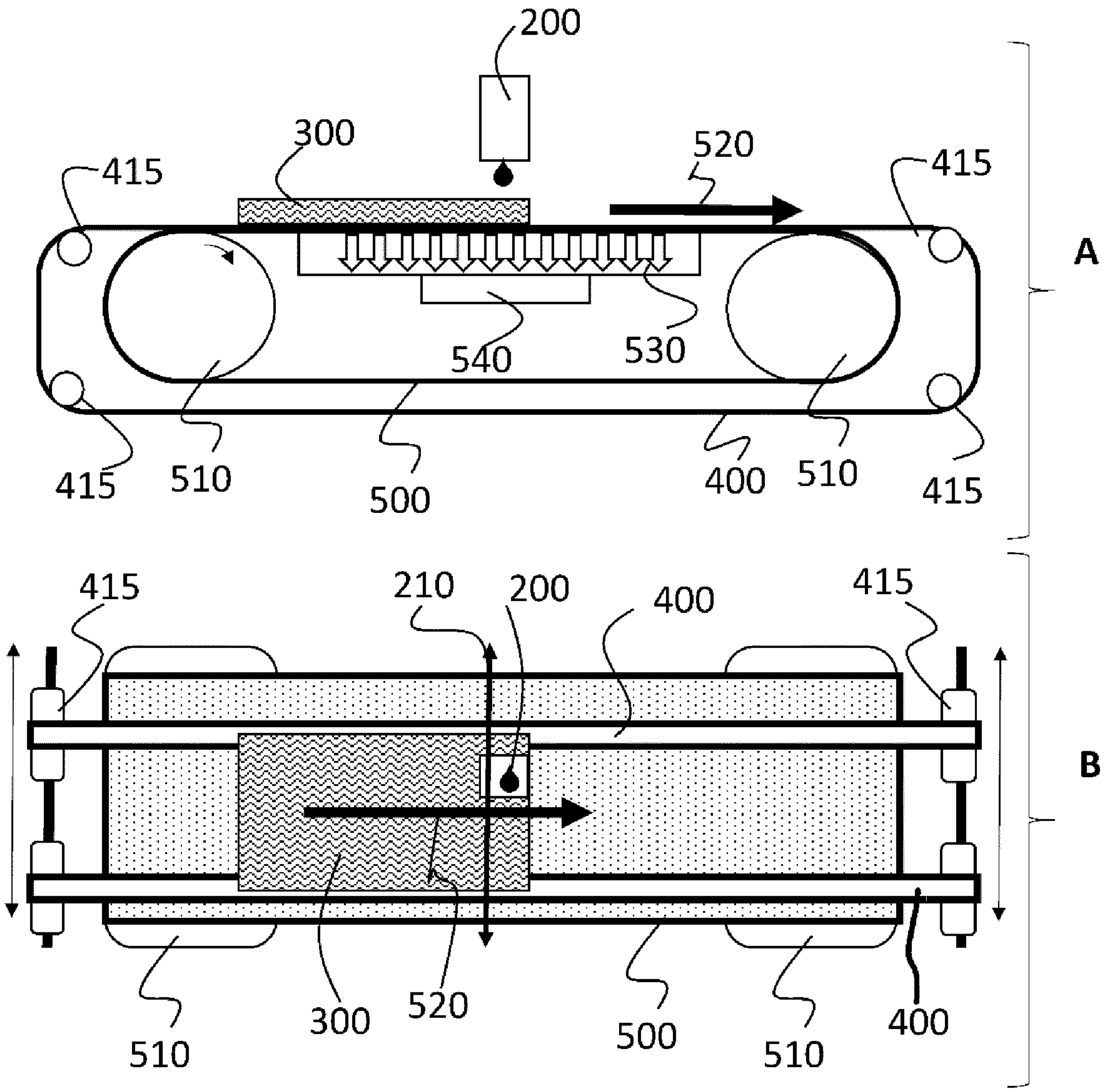
FIG. 2 is similar as the inkjet printing device in FIG. 1 but with additional strap (400) up to the rough vacuum belt (500) and below another side of the cardboard (300). Both straps (400) are wrapped around pulleys (415) instead of gliders (410). The pulleys (415) are movable across the transport direction (520).
Figure 3:
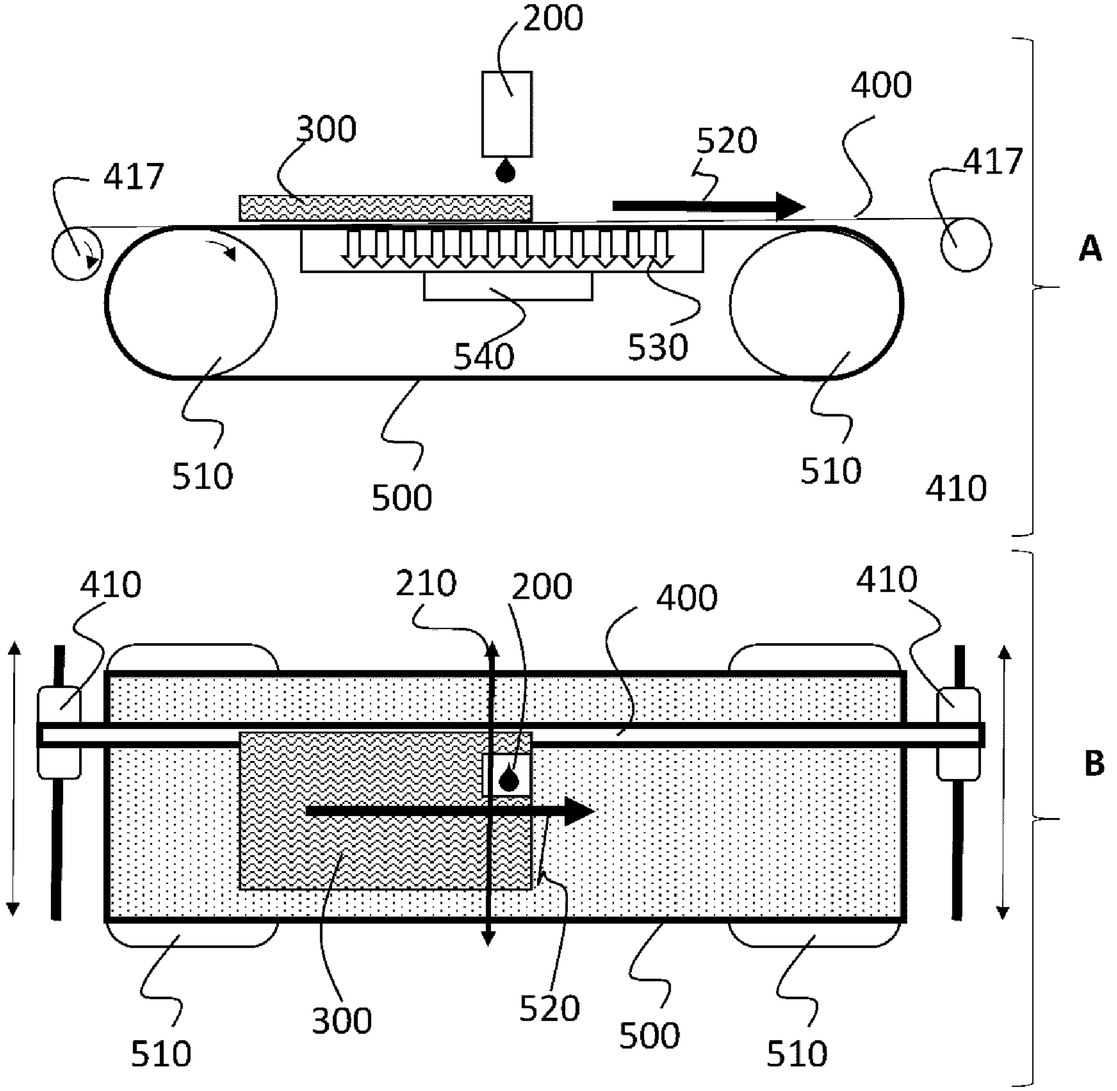
FIG. 3 is similar as the inkjet printing device in FIG. 1 but the strap (400) is supplied on the rough vacuum belt (500) from a roll (417) and after use re-winded an another roll (417) preferably for $2^{nd}$ use as strap (400) in the inkjet printing device.
Figure 4:
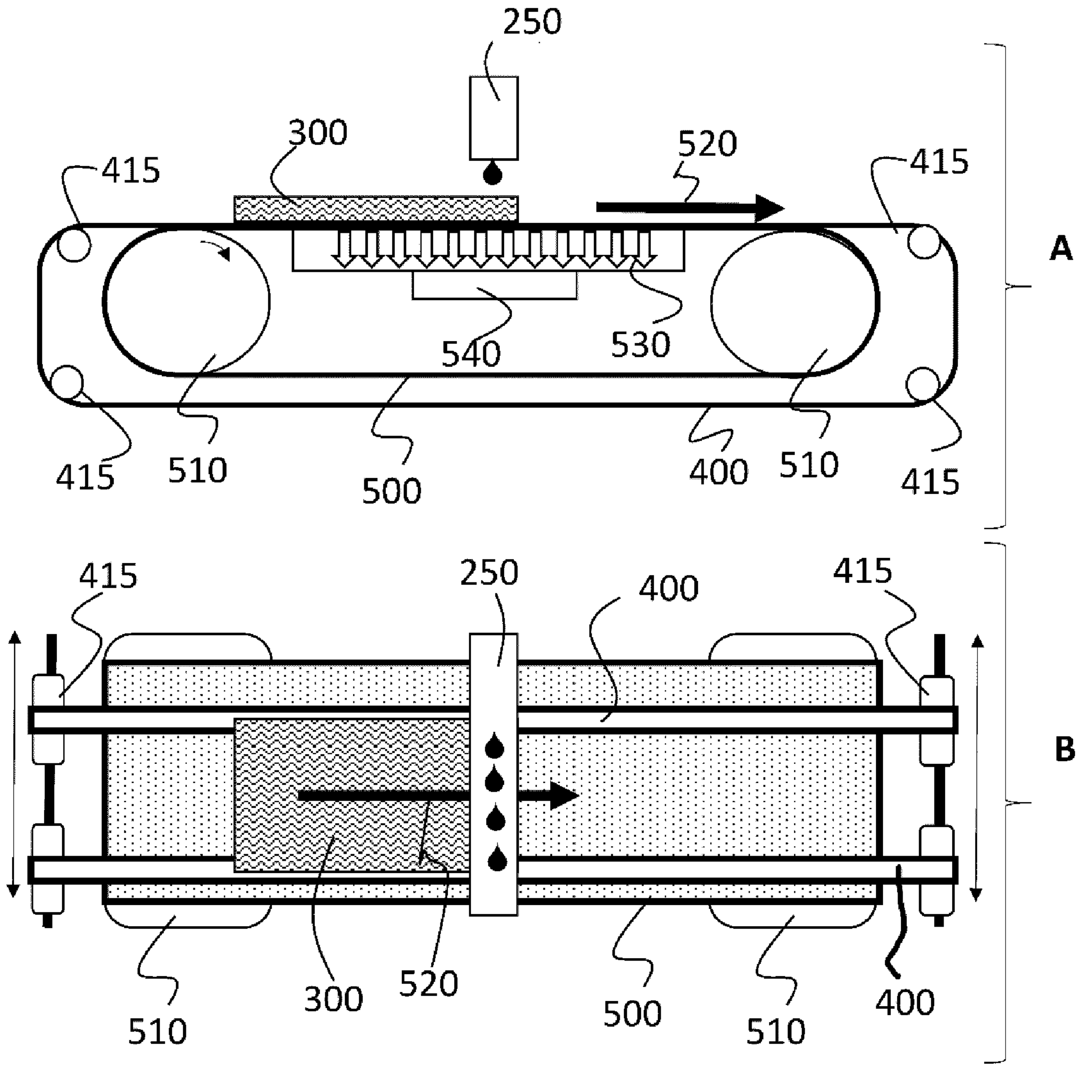
FIG. 4 is similar as the inkjet printing device in FIG. 2 but wherein a single pass inkjet printing method is used with an elongated printhead unit (250).

The inkjet printing device used for the present embodiment is for printing on a cardboard (300) wherein said inkjet printing device has a rough vacuum belt (500) capable of transporting in a transport direction said cardboard (300) having a side parallel to said direction; and a strap (400); and wherein the inkjet printing device is capable for positioning an elongated part of said strap (400) between said side and said vacuum belt (500) and another elongated part of said strap (400) covering only said vacuum belt (500); and wherein a support area of said vacuum belt (500) for carrying said cardboard (300) and said strap (400) has a surface roughness from 8.0 μm to 3500.0 μm, preferably from 50 μm to 1000 μm and most preferably from 70 to 500 μm.

Cardboard (300) is rectangular, thus having four sides, wherein the cardboard (300) is applied on the rough vacuum belt (500) so the side is oriented parallel to the direction. The cardboard (300) can also be an unpacked packaging box which is made of cardboard (300) for printing on one of the sides of the packaging box before it is formed to said packaging box for example by gluing and/or folding.

A vacuum belt is using vacuum power from a vacuum chamber. The cardboard (300) and the strap (400) are in the present embodiment hold down against the rough vacuum belt (500) which has air-suction elements, such as apertures, that are connected with said vacuum chamber (540) preferably via a vacuum table.

The cardboard (300) is preferably corrugated fibreboard.

Said inkjet printing device is thus capable of using an inkjet printing method on a cardboard (300) by transporting in a transport direction (520) with a rough vacuum belt (500) while said cardboard (300) having a side parallel to said direction; and a strap (400); and wherein the inkjet printing device is capable for positioning an elongated part of said strap (400) between said side and said vacuum belt (500) and another elongated part of said strap (400) covering only said vacuum belt (500); and wherein a support area of said vacuum belt (500) for carrying said cardboard (300) and said strap (400) has a surface roughness from 8.0 μm to 3500.0 μm. The use of the inkjet printing device is preferably for printing on a corrugated fibreboard.

By said strap (400) the loss of vacuum that normally happens at the side of the cardboard (300) is smothered so the suction force remains underneath the carried cardboard (300) very well even the cardboard (300) has wavy edges or warped surface due to inner tensions resulting from non-uniform distribution of the moisture within the cardboard. Also there is now a capability to print borderless. The easy replaceable strap (400) may hereby be spoiled with ink but not the rough vacuum belt.

In a preferred embodiment the strap (400) comprises an adhesive layer to hold down the side of the cardboard (300) even more.

In a preferred embodiment the strap (400) is guided for controlling the transport path which have to be straight.

Rough Vacuum Belt

The vacuum support (530) for carrying and transporting the cardboard (300) is in the present embodiment a vacuum belt with a specific roughness.

The cardboard (300) is hold onto the vacuum support (530) by vacuum suction. Said vacuum suction is provided through said vacuum support (530) by a connected vacuum chamber (540) via a plurality of apertures and air channels. The working of a vacuum support, such as vacuum table or vacuum belt are well-known. An example of such vacuum support (530) is disclosed in WO2016/071122 A1 (AGFA GRAPHICS NV) and US20170305172A1 (AGFA NV)

A vacuum belt is sometimes called a porous conveyor belt. The length of the vacuum belt is measured in the transport direction (520) and is the maximum distance that an object on said vacuum belt (500) can be transported (from input to output). A vacuum belt is a conveyor belt that preferably is wrapping two or more pulleys wherein one (or more) pulleys may be powered by a motor for turning one of said pulleys whereby the conveyor belt is moving in said transport direction. Another way of moving the conveyor belt is for example disclosed in EP2803493A1 (AGFA NV) where the conveyor belt is moved by grippers along the side of the conveyor belt; or the conveyor belt may be moved by another conveyor belt.

In a preferred embodiment is the rough vacuum belt (500) wrapped around another vacuum belt which is capable to transport said rough vacuum belt (500) in the transport direction (520) and to hold down with vacuum power said rough belt against the other vacuum belt. The rough vacuum belt (500) is hereby wrapping two or more pulleys or two or more gliders which are not wrapped by said other vacuum belt. The rough vacuum belt (500) is air-sucked against the other vacuum belt and while moving the other vacuum belt also the rough vacuum belt (500) is moved in the transport direction. The tension of said rough vacuum belt (500) is hereby preferably lower than the tension of the other vacuum belt. The vacuum power from a vacuum chamber (540) through air-suction elements of the other vacuum belt is then also used through air-suction elements of the rough vacuum belt (500) to hold down the cardboard (300) and the strap. Said preferred embodiment forms preferably a first assembly from bottom to top: a1) the other vacuum belt; b1) the rough vacuum belt; c1) an elongated part of the strap (400) and d1) a part of the cardboard (300) including the side of the cardboard; a second assembly from bottom to top: a2) the other vacuum belt; b2) the rough vacuum belt; c2) an other elongated part of the strap; and a third assembly from bottom to top: a3) the other vacuum belt; b3) the rough vacuum belt; c3) an other part of the cardboard. The wrapped rough vacuum belt (500) is hereby wrapping two or more pulleys or gliders which are not in contact with the other vacuum belt.

The roughness ($R_a$), sometimes called surface roughness, of the support area is between 8 μm and 3500 μm; more preferably between 10 μm and 1000 μm; and most preferably between 50 μm and 750 μm. Said roughness is a component of surface texture of the rough vacuum belt. A very small roughness means a smooth support area. The surface roughness may be measured with a Dektak-8™ stylus profiler and contact-based 2D topography measurements. The geometry of the stylus is preferably 2.5 μm at 45 degrees and a stylus force 15 mg with a scan-resolution of 1.1 μm per sample. The processed option of the measurement is preferable X-flattening of Dektak™.

The roughness of the support area is caused by a plurality of peaks and valleys at the support area. The cardboard (300) is hereby mostly carried on said plurality of peaks. Between said plurality of peaks and valleys there is a connection with one or more air-suction elements of the rough vacuum belt. The roughness of the support area is more preferably caused by a support area having a plurality of cups which has a closed bottom end ("valley") and wherein minimum one air-suction element of the rough vacuum belt (500) is connected with one or more cups of said plurality of cups preferably by lateral air grooves in said support area. For the preferred embodiment with the plurality of cups the surface roughness (Ra) is preferably between 10 μm and 500 μm.

The vacuum belt preferably comprises a set of air-channels connecting top-surface and bottom-surface of the vacuum belt; and the set of air-channels couples the cardboard (300) and strap (400) to the vacuum belt by vacuum suction in the set of air-channels; and wherein the vacuum belt is characterized by having a plurality of cups at the top-surface wherein each cup comprises a closed bottom end; and wherein the cup is connected with an air-channel of the set of air-channels to form an air cup and to couple the cardboard (300) to the vacuum belt at the cup by vacuum suction.

The roughness may also be created by using a mesh belt wherein the fibres, which forms the mesh, are forming the plurality of peaks and valleys to guarantee a surface roughness of the present embodiment and preferred embodiments. The mesh belt is preferably a woven structure of fibres more preferably selected from the group of PTFE, plastic coated fibers, metal, aluminium, glass, polyester, textile. The air suction elements in a mesh belt are than preferably the openings between said woven fibres. The "open area %" of said mesh belt s preferably larger than 5% more preferably between 20% and 80%. The mesh is preferably a woven structure of fibres in a weave pattern selected from the group plain weave, twill weave, plain Dutch weave, twill Dutch weave, five heddle weave, reverse Dutch weave. In a less preferred embodiment the support area of said mesh belt comprises an adhesive layer for holding down the cardboard (300) even more. For the preferred embodiment with the mesh belt the surface roughness ($R_a$) is preferably between 50 μm and 1500 μm.

The present embodiment is tested and validated with the following inkjet printer: Jeti Tauro H2500, manufactured by Agfa NV.

Strap

The inkjet printing device is thus capable of transporting the cardboard (300) and the strap (400) by vacuum power with the rough vacuum belt. Preferably, the strap (400) is wrapped around the rough vacuum belt (500) along the transport direction. The tension of the strap, which is wrapped around the rough vacuum belt, is hereby preferably lower than the vacuum belt to allow moving the strap (400) easily across the width of the vacuum belt for replacing and adapting the location on the rough vacuum belt. Hereby is the wrapped strap (400) also wrapping two or more pulleys (415) or two or more gliders (410) which are not wrapped by the rough vacuum belt. The strap (400) is air-sucked against the rough vacuum belt (500) and while moving the rough vacuum belt (500) also the strap (400) is moved in the transport direction. To make it capable for positioning the elongated part between said side and said vacuum belt (500) and another elongated part covering only said vacuum belt (500), said two or more pulleys/gliders may be movable across the transport directions so the strap (400) may be positioned according the dimension of the cardboard. For example, said two or more pulleys/gliders may each be movable attached on an axis which is oriented perpendicular the transport direction.

The strap (400) may also be applied on the rough vacuum belt (500) from an input roll and when leaving the rough vacuum belt (500) rolled up on an output roll. The strap (400) is air-sucked against the rough vacuum belt (500) and while moving the rough vacuum belt (500) also the strap (400) is moved in the transport direction (520) from said input roll to said output roll. To make it capable for positioning the elongated part between said side and said vacuum belt (500) and another elongated part covering only said vacuum belt (500) the said input roll and output roll may be movable across the transport directions so the strap (400) may be positioned according the dimension of the cardboard. For example, said input and output roll may each be movable attached on an axis which is oriented perpendicular the transport direction.

In the present embodiment the strap (400) is elongated and has a width; which is measured across the transport direction (520) preferably between 10.0 mm and 200.0 mm. The width may not that big because the middle of the cardboard has to be in contact with the vacuum belt (500). In the present embodiment the side of the cardboard (300) is carried by said strap. The width of overlap of the cardboard (300) and the strap (400) is preferably between 2% and 90% of the width of the strap, More preferably between 10% and 70% of the width of the strap. It is found that If the overlap is too high and especially when the width of the strap (400) is too big, the solution is less effective to overcome the problems described above.

The thickness of the strap (400) of the present embodiment and preferred embodiments is preferably from 0.03 mm to 3.50 mm, more preferably from 0.04 mm to 1.00 mm. If the strap (400) is too thick the part of the cardboard (300) which is carried by the strap (400) may become levelled whereby the print gap has to be altered causing a worse image quality.

In a preferred embodiment the side or another side of the cardboard (300) may be plied for example by punching a fold line nearby said side and parallel to said side. This can be an additional step at the entrance of the cardboard (300) in the inkjet printing device. To avoid that also the strap (400) is punched a nip may be added in the strap (400) at the position where the punching is applied on the cardboard, preferably at the print side of the cardboard. To avoid a deep or sharp folding line the punching is done with a soft knife such as a rubber knife.

In the present embodiment and present preferred embodiments, the rough vacuum belt (500) is capable of transporting another strap (400) wherein said other strap (400) is capable for positioning an elongated part of said other strap (400) between a parallel side of the side of the cardboard (300) and said vacuum belt (500) and another elongated part of said other strap (400) covering only said vacuum belt (500). The both sides, parallel to each other, are each carried by a strap (400) which is also transported on the rough vacuum belt. The other strap (400) is also hold down by air-suction against said vacuum belt (500) and transported by moving said vacuum belt (500), preferably the same way as the strap. By said other strap (400) the loss of vacuum that normally happens at the parallel side of the cardboard (300) is smothered so the suction force remains underneath the carried cardboard (300) very well even the cardboard (300) has wavy edges or warped surface due to inner tensions resulting from non-uniform distribution of the moisture within the cardboard.

The strap (400) and/or the other strap (400) are preferably wrapped around the rough vacuum belt.

The strap (400) has preferably an air-permeability below 10 L/(dm$^2$×min) more preferably below 3 L/(dm$^2$×min), most preferably below 1 L/(dm$^2$×min). Said air-permeability can be measured with an AKUSTRON™ air permeability tester which follows industry standards DIN 53887, DIN 53120, ISO9237 and ASTM D 737-96. The air-permeability is thus measured in minutes, abbreviated as 'min'. The strap (400) is hereby preferably made of PTFE or comprising plastic coated fibers, comprising elastomer coated fiber or is HDPE, PET, metal, metal coated PTFE . . . .

It is found that a strap (400) made of fiberglass carrier silicone coated, rubber coated or foam coated gives a very good result.

The side of the strap whereon the cardboard (300) is supported may comprise an adhesive layer for better fixing the cardboard (300).

Inkjet Printing Device

The present embodiment is performed by an inkjet printing device but it may also by any other printing device. Said printing device marks a pattern on a surface of a cardboard (300) such as on a liner of a corrugated fibreboard. The marking of a pattern on a surface is also called printing. The pattern represents an image which may be text, photograph, graphic or logo. The pattern is mostly the result of a halftoning method of the image such as an error-diffusion method or an amplitude modulation halftoning method. The pattern may have an achromatic or chromatic color. By printing a pattern on a cardboard, the cardboard (300) is decorated.

The input side, briefly "input", of the inkjet printing device is the side where the cardboard (300) is applied on the rough vacuum belt (500) and the strap (400) and the output side, briefly "output", of said inkjet printing device is the side (after printing and/or post-treatment) said cardboard (300) is removed from said rough vacuum belt (500) and said strap.

The marking of the printing device may be done by any conventional printing technology such as offset printing, gravure printing, letterpress printing, screen printing. These conventional printing methods are all described in 'Chapter 2. Printing Technologies With Permanent Printing Master', P204-448 in 'Handbook of Print Media, Technologies and Production Methods' by Helmut Kipphan, ISBN 3-540-67326-1 Springer-Verlag Berlin Heidelberg New York, 2001. Such printing device is also called a conventional printing device.

Preferably the printing device in the present embodiment is a digital printing device such as an electrophotography-based, devices, iconography-based, magnetography-based, inkjet-based printing device. A digital printing device is sometimes called a printer and an inkjet-based printing device is sometimes called an inkjet printing device. These digital printing methods are all described in 'Chapter 4. Printing Computer to . . . Technologies', 'Subchapter 4.5 Computer to Print", P657-674, and 'Chapter 5. Printing Technologies without a Printing Plate (NIP Technologies)', P676-758 in 'Handbook of Print Media, Technologies and Production Methods' by Helmut Kipphan, ISBN 3-540-67326-1 Springer-Verlag Berlin Heidelberg New York, 2001. The printing device may be a hybrid printing device wherein conventional printing technologies and digital and/or non-impact printing technologies are combined in a printing device.

A preferred printing technology for the present embodiment is thus an inkjet printing technology. The ink for forming an image is preferably jetted by a pigmented aqueous inkjet ink. The printing device from the present embodiment is thus preferably an inkjet printing device which is a printing device comprising an inkjet print head. The inkjet technology may be continuous inkjet or drop on demand inkjet which is preferably selected from the group thermal inkjet, piezo inkjet and electrostatic inkjet. The inkjet printing device is preferably a large-format inkjet printing device wherein printable width of more than 135 cm are common but also printable widths of more than 200 cm. An example of such large-format inkjet printing device in a multi-pass inkjet printing method is Jeti Tauro™ manufactured by AGFA NV with a maximum printable width of 254 cm and which can accommodate for example rigid media up to 400 cm in length. An example of another large-format inkjet printing device with a single-pass inkjet printing method is KBA RotaJet™ L-series with a maximum print width of 1.3 meter.

The inkjet printing device may comprise a page-wide inkjet print-head which covers the whole width or larger than the width of the cardboard, a so called single pass inkjet printer. In a preferred embodiment the pattern is inkjet printed in one pass, also called single-pass inkjet printing method, which guarantees an economical benefit by having larger throughputs than in a multi-pass inkjet printing method. Detailed information on inkjet technologies and building-up of inkjet printers can be found in 'Inkjet Technology and Product Development Strategies' by Stephen F. Pond, Torrey Pines, 2000.

To enhance the adhesion of the pattern on the cardboard (300) the printing device may comprise a dryer to dry the marked pattern on the cardboard (300) and/or to have a better adhesion of the marked pattern on the cardboard. A typical dryer sometimes also called curing device, in such printing devices comprises an ultraviolet light (UV) source and/or infrared (IR) radiation source.

The drying of the marked pattern may be done by radiation (UV and/or IR and/or NIR and/or SWIR) from the backside to the printed side of the cardboard. Or the drying of the marked pattern may be done by radiation (UV and/or IR and/or NIR and/or SWIR) above the marked pattern.

Any ultraviolet light source, as long as part of the emitted light, may be employed as a radiation source, such as a high- or low-pressure mercury lamp, a cold cathode tube, a black light, an ultraviolet LED, an ultraviolet laser, and a flash-light.

The IR source is preferably a NIR source (=Near Infra-Red source) such as a NIR lamp or a SWIR (=Short Wave Infra-Red source) such as a SWIR lamp. The IR source may comprise carbon infrared emitters which has a very short response time. An IR source is also called infrared radiation source. The IR source may comprise an air blower for blowing hot air warmed up by the IR source.

Adhesive Layer

An adhesive may be used for attaching a cardboard (300) with its side to the support area. The adhesive may be applied as layer to the rough vacuum belt (500) and/or the cardboard.

Any adhesive known in the art can be used in the present invention, going from classical known adhesives to bio-mimic based adhesives. Repositionable adhesives are preferred, as they facilitate the process for ensuring that the leather is attached completely flat on the carrier causing no collision with the inkjet print heads. Heat sensitive glue is preferred because there is already light tackiness at room temperature and a high tackiness already from 30° C.

Bio-inspired reversible adhesives have been described by del Campo and Fernández-Blázquez (Biomimetic Approaches for Biomaterial Development, chapter 11, ed. João F. Mano, Wiley-VCH Verlag GmbH& Co. KGaA, first edition, 2012).

Adhesives are known in different fields of technology such as textile printing, where water gluing and dry bonding approaches are used. Within dry bonding approaches, both permanent and thermoplastic adhesives are known in the art. Adhesives for textile printing are disclosed in Ullmans Encyclopädie der technischen Chemie, 4. Auflage, Band 23, 76-77 (VERLAG CHEMI, WEINHEIM).

In the present embodiment, pressure sensitive adhesives are a particular preferred type of adhesives. Removable pressure sensitive adhesives are known from applications such as the Post-It™ notes from 3M.

Preferred polymers for pressure sensitive adhesives are selected from the group consisting of polyacrylates, silicone polymers, polydienes or copolymers thereof such as natural rubber and styrene-butadiene type of rubbers and block copolymers of styrene and a diene. Typical formulations of pressure sensitive adhesives further contain tackifying resins to tailor the properties towards the application. Pressure sensitive adhesives further can contain additives such as waxes, plasticizers and anti-oxidants.

The pressure sensitive adhesive is applied on a surface from water, a solvent or as a hot melt adhesive. Hot melt adhesives and water borne adhesives are preferred. Water borne adhesives are particularly preferred. Water borne pressure sensitive adhesives are emulsion-based and have been described in detail by Jovanović and Dubé (Journal of Macromolecular Science, Part C-Polymer Reviews, C44(1), 1-55 (2004)).

Suitable adhesives are available from KIWO (KISSEL+ WOLF GmbH).

There is no limitation on the way of applying the adhesive to a surface, which may be e.g. by coating or by spraying. A commercial example of a suitable spray adhesive is the 3M™ Repositionable 75 Spray Adhesive. Spray adhesives are also known as aerosol adhesives.

Use of an adhesive has also some disadvantages such as glue remaining on the side or air-permeable support, need of an extra pressure device . . . . But it is found when using heat sensitive glue, such as KIWOTEX TDK 35L from KIWO™, the contamination of glue on the side is very limited after step of inkjet printing.

Images

There are no real limitations for the image to be digitally printed. A single colour or multiple colours may be used for digitally printing the image. It may be a single image, or it may consist of multiple images or sub-images. For example, multiple images may be printed on different cardboards.

The image is preferably digitally printed according to the cardboard (300) dimensions. This way it is prevented that part of the image is not undesirably printed on the rough vacuum belt. But in the present embodiment the straps may be easily replaced if a part is not printed well on the cardboard. This is an extra advantage which prevents the spoiling of the rough vacuum belt.

There is also no real limitation on the content of the image. It may contain decorative features, company logo's, trademarks, photographs, drawings and cartoons and/or information. The information may be human readable, such as text, or it may be machine readable, such as a bar code, or a combination of both.

The image preferably contains one or more machine readable codes, more preferably multiple machine readable codes. These multiple machine readable codes may be different or the same. By using multiple identical machine readable codes on different surfaces of the package, the case where problems occur due to a damaged machine readable code being unreadable can be avoided as usually an intact machine readable code remains readable on a different surface of the package.

There is no restriction on the type of machine readable code or the information it contains. It may be a simple bar code, but it may also be a so-called 2D code.

Cardboard

The cardboard (300) can come in a variety of constructions, such as e.g. honeycomb cardboard, however for easy creasing preferably a cardboard (300) using a paper fluting medium is used.

A particular preferred cardboard (300) is corrugated fibreboard as it is low cost and lightweight.

Corrugated fibreboard is a packaging material formed by gluing one or more fluted sheets of paperboard (corrugating medium) to one or more flat sheets (called facings) of linerboard. Its comes in four common types: (1) Single face: one fluted sheet glued to one facing (total two sheets). (2) Single wall: one fluted sheet sandwiched between two facings (total three sheets); also called double face or single ply. (3) Double wall: one single-face glued to one single wall so that two fluted sheets are alternatively sandwiched between three flat sheets (total five sheets); also called double cushion or double ply. (4) Triple wall: two single-face glued to one single wall so that three fluted sheets are alternatively sandwiched between four flat sheets (total seven sheets); also called triple ply. The preferred corrugated fibreboard in the present invention is single wall or double wall, more preferably single wall corrugated fibreboard as this is sufficiently strong and easy to crease. Single face corrugated fibreboard generally has insufficient strength to hold the merchandise articles, while triple wall cardboard (300) is often more difficult to crease into a packaging box.

The paper used in corrugated fibreboard, such as Kraft paper, has often a brownish colour. In a preferred embodiment of the corrugated fibreboard, the outer surface of the outer paper liner has a white colour for enhancing the colour vibrancy of the inkjet inks printed thereon. The white colour background contributes to the customer experience as the customer regards this as a more luxurious product. Alternatively, the white background may be applied as a layer by coating or printing prior to inkjet printing. Another advantage of a paper based cardboard (300) is the recyclability.

The present embodiment is suitable for printing on flat cardboard (300) and unassembled packaging box but also for printing on an assembled packaging box, which is three-dimensional object and made from cardboard, preferably corrugated fibreboard. The image may then be applied on one or more sides of said assembled packaging box.

Inkjet Inks

The inkjet ink contains a colorant, which may be a dye or a colour pigment. The inkjet inks are preferably pigmented inkjet inks as the use of colour pigments provide higher light stability than dyes.

An aqueous inkjet ink preferably includes at least a colour pigment and water, more preferably completed with one or more organic solvents such as humectants, and a dispersant if the colour pigment is not a self-dispersible colour pigment.

A UV curable inkjet ink preferably includes at least a colour pigment, a polymeric dispersant, a photoinitiator and a polymerizable compound, such as a monomer or oligomer.

If multi-colour images are desired, the inkjet inks are composed into an inkjet ink set having differently coloured inkjet inks. The inkjet ink set is preferably a CMYK inkjet ink set. The inkjet ink set may be extended with extra inks such as white, brown, red, green, blue, and/or orange to further enlarge the colour gamut of the image. The inkjet ink set may also be extended by the combination of the full density inkjet inks with light density inkjet inks. The combination of dark and light colour inks and/or black and grey inks improves the image quality by providing a lowered graininess.

Colorants

The colorant in an inkjet ink may include a dye, but preferably consists of a colour pigment. The pigmented inkjet ink preferably contains a dispersant, more preferably a polymeric dispersant, for dispersing the pigment. In addition to the polymeric dispersant, the pigmented inkjet ink may contain a dispersion synergist to further improve the dispersion quality and stability of the ink.

In a pigmented aqueous inkjet ink, the aqueous inkjet ink may contain a so-called "self dispersible" colour pigment. A self-dispersible colour pigment requires no dispersant, because the pigment surface has ionic groups which realize electrostatic stabilization of the pigment dispersion. In case of self-dispersible colour pigments, the steric stabilization obtained by using a polymeric dispersant becomes optional.

The colour pigments may be black, white, cyan, magenta, yellow, red, orange, violet, blue, green, brown, mixtures thereof, and the like. A colour pigment may be chosen from those disclosed by HERBST, Willy, et al. Industrial Organic Pigments, Production, Properties, Applications. 3rd edition. Wiley-VCH, 2004. ISBN 3527305769.

The invention claimed is:

1. An inkjet printing method on a rectangular cardboard having a width between a first side and a second side, parallel to each other, and wherein the cardboard is transported in a transport direction by a vacuum belt comprising:

applying a first strap and a second strap, parallel to each other and the transport direction and with a space between each other, on the vacuum belt which has a rough support area having a surface roughness ($R_a$) from 8 μm to 3500 μm;

applying the cardboard on the vacuum belt wherein said cardboard overlaps partially the applied first strap at the first side of said cardboard and overlaps partially the applied second strap at the second side of said cardboard and wherein between said first side and second side the cardboard is in contact with the vacuum belt;

applying vacuum power at said rough support area for attaching said strap and said cardboard; and transporting said attached first and second strap and attached cardboard during inkjet printing an image on said attached cardboard.

2. The inkjet printing method of claim 1, wherein the first strap and the second strap are wrapped around the rough vacuum belt.

3. The inkjet printing method of claim 2, wherein the first strap and/or second strap has an adhesive layer for better fixing the cardboard.

4. The inkjet printing method of claim 3, wherein the rough vacuum belt is a mesh belt.

5. The inkjet printing method of claim 2, wherein the rough vacuum belt is wrapped around another vacuum belt which transports said rough vacuum belt in the transport direction.

6. The inkjet printing method of claim 2, wherein the support area comprises a plurality of cups and wherein minimum one air-suction element at the opposite side of the support area is connected with one or more cups of said plurality of cups.

7. The inkjet printing method of claim 2, wherein the rough vacuum belt is a mesh belt.

8. The inkjet printing method of claim 2, wherein the width of the strap is between 10 mm and 200 mm.

9. An inkjet printing method of claim 8, wherein the thickness of the strap is between 0.03 mm to 3.50 mm.

10. The inkjet printing method of claim 1, wherein the support area comprises a plurality of cups and wherein minimum one air-suction element at the opposite side of the support area is connected with one or more cups of said plurality of cups.

11. The inkjet printing method of claim 1, wherein the rough vacuum belt is a mesh belt.

12. The inkjet printing method of claim 11, wherein the support area of the mesh belt comprises an adhesive layer for holding down the cardboard.

13. The inkjet printing method of claim 11, wherein the open mesh is woven by fibres comprising PTFE, textile or glass.

14. The inkjet printing method of claim 1, wherein the width of the strap is between 10 mm and 200 mm.

15. An inkjet printing method of claim 14, wherein the thickness of the strap is between 0.03 mm to 3.50 mm.

* * * * *